UNITED STATES PATENT OFFICE.

RICHARD B. ARMENTROUT, OF MENARDVILLE, TEXAS.

COMPOUND FOR DESTROYING BOLL-WEEVIL.

987,102.  Specification of Letters Patent.  Patented Mar. 21, 1911.

No Drawing.  Application filed February 25, 1909.  Serial No. 479,853.

*To all whom it may concern:*

Be it known that I, RICHARD B. ARMENTROUT, a citizen of the United States, residing at Menardville, in the county of Menard and State of Texas, have invented new and useful Improvements in Compounds for Destroying Boll-Weevil, of which the following is a specification.

This invention is an improved compound for destroying boll weevil, a pest which is very injurious to cotton.

My improved compound consists of the following named ingredients in the proportion specified:

| | |
|---|---|
| Sulfur | 7 pounds |
| Pine tar | 4 pounds |
| Asafetida | 4 pounds |
| Pulverized bluestone | 1 pound |
| Beaumont oil | 1 gallon |
| Extract of tobacco | 1 gallon |
| A thick adhesive oil | 5 gallons |

The mixture or compound is applied to the cotton plants while the same are being cultivated and is very destructive to the boll weevil. If the boll weevil has been particularly injurious during previous years the old stalks and the ground should also be sprayed with dilute caustic alkali of the strength of about 10 pounds of the lye to 10 gallons of water.

The tobacco extract and Beaumont oil, which is a specific petroleum oil possessing slight insecticidal properties, serve as a vehicle for the solid constituents, which, when combined, form an emulsion which may be conveniently sprayed or spread over the surfaces of the plant, but is not sufficiently adhesive in character to adhere strongly to the plant, and, hence, is liable to be washed off by rains. To overcome this objection, the thick adhesive oil referred to is employed, which, in addition to preventing the emulsion from drying out and scaling off, waterproofs the mixture and causes it to adhere to the surfaces of the plant. Such adhesive oil, which is a compound oil, is preferably composed of petroleum, third fraction, 90 per cent., and fish oil, 10 per cent. This oil in addition to possessing the properties mentioned, does not, like crude hydrocarbon or heavy greases, coat the composition so thickly as to decrease the efficiency of the insecticide.

What is claimed is:

A compound for destroying boll weevil comprising sulfur, pine tar, asafetida, blue stone, Beaumont oil, tobacco extract, and a lubricating oil.

In testimony whereof I affix my signature in presence of two witnesses.

RICHARD B. ARMENTROUT.

Witnesses:
J. D. SCRUGGS,
W. H. CALDWELL.